United States Patent
Usuda et al.

(10) Patent No.: US 10,405,240 B2
(45) Date of Patent: Sep. 3, 2019

(54) MOBILE COMMUNICATION SYSTEM, WIRELESS CONTROL STATION, WIRELESS BASE STATION, MOBILE STATION, AND MOBILE COMMUNICATION METHOD

(75) Inventors: Masafumi Usuda, Tokyo (JP); Anil Umesh, Yokohama (JP); Takehiro Nakamura, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 194 days.

(21) Appl. No.: 11/662,902

(22) PCT Filed: Sep. 15, 2005

(86) PCT No.: PCT/JP2005/017064
§ 371 (c)(1),
(2), (4) Date: Apr. 26, 2007

(87) PCT Pub. No.: WO2006/030869
PCT Pub. Date: Mar. 23, 2006

(65) Prior Publication Data
US 2007/0293203 A1 Dec. 20, 2007

(30) Foreign Application Priority Data
Sep. 15, 2004 (JP) .................................. 2004-268947

(51) Int. Cl.
*H04W 72/00* (2009.01)
*H04W 74/00* (2009.01)
*H04W 28/22* (2009.01)

(52) U.S. Cl.
CPC .................................... *H04W 28/22* (2013.01)

(58) Field of Classification Search
USPC ...... 455/458, 464, 466, 11.1, 509, 511, 515, 455/68, 550.1, 552.1, 553.1, 556.2, 560,
(Continued)

(56) References Cited

U.S. PATENT DOCUMENTS 7,158,504 B2   1/2007  Kadaba et al.
7,212,536 B2   5/2007  Mackiewich et al.
(Continued)

FOREIGN PATENT DOCUMENTS

CA   2371958 A1 * 10/2000  ............. H04B 1/707
CN   1265546 A    9/2000
(Continued)

OTHER PUBLICATIONS

UMTS (XX.05) V0.6.0 Jan. 1999, "UTRA FDD, spreading and modulation description" (Year: 1999).*
(Continued)

*Primary Examiner* — San Htun
(74) *Attorney, Agent, or Firm* — METROLEX IP LAW GROUP, PLLC

(57) ABSTRACT

It is an objective of the present invention to suppress an influence on a downlink and to appropriately control a transmission rate of uplink user data. A mobile communication system according to the present invention includes: a transmission section for transmitting to a mobile station an exclusive channel for notifying a mobile station of transmission rate information regarding a transmission rate of user data of an uplink channel; and a transmission rate control section for determining transmission rate information to be used by the mobile station and to instruct the mobile station to receive the exclusive channel for notifying the determined transmission rate information. The transmission section transmits, to the mobile station, the exclusive channel for notifying the determined transmission rate information.

16 Claims, 7 Drawing Sheets

(58) Field of Classification Search
USPC .............. 455/561, 418–455, 67.11; 370/338,
370/229–236, 310.2, 324, 328–333, 341,
370/348, 350–356, 373, 443, 465, 496,
370/522, 543–545; 714/48–52, 758,
714/798–800
See application file for complete search history.

(56) References Cited

U.S. PATENT DOCUMENTS

| | | | | |
|---|---|---|---|---|
| 2002/0114289 | A1* | 8/2002 | Ishikawa | H04J 13/16 370/320 |
| 2003/0139140 | A1* | 7/2003 | Chen | H04B 7/022 455/67.11 |
| 2003/0224798 | A1* | 12/2003 | Willenegger | H04J 13/18 455/450 |
| 2004/0120302 | A1* | 6/2004 | Sebire et al. | 370/347 |
| 2004/0131106 | A1* | 7/2004 | Kanterakis | H04W 52/286 375/141 |
| 2004/0198369 | A1* | 10/2004 | Kwak | H04W 28/22 455/452.2 |
| 2004/0219919 | A1* | 11/2004 | Whinnett et al. | 455/442 |
| 2004/0221218 | A1* | 11/2004 | Grob | H04B 7/2656 714/748 |
| 2005/0025100 | A1* | 2/2005 | Lee | H04W 72/1257 370/335 |
| 2005/0030953 | A1* | 2/2005 | Vasudevan et al. | 370/395.4 |
| 2005/0249133 | A1* | 11/2005 | Terry | H04L 1/0025 370/278 |

FOREIGN PATENT DOCUMENTS

| | | |
|---|---|---|
| CN | 1428976 A | 7/2003 |
| EP | 1 033 849 A1 | 9/2000 |
| JP | 2-295239 | 12/1990 |
| JP | 2000-358281 | 12/2000 |
| WO | 02/45362 A2 | 6/2002 |

OTHER PUBLICATIONS

ETSI TS 125 213 V4.0.0 (Mar. 2001), "UMTS; FDD, 3GPP" (Year: 2001).*

3GPP TSG RAN Working Group 1 meeting #33, R1-03-0709, New York, USA, Aug. 25-29, 2003, Agenda item: Enhanced Uplink—10.1, Source: Telecom MODUS, NEC, Title: Robust feedback scheme for closed loop rate control in E-DCH., Document for: Discussion.

3GPP TSG RAN2 Meeting #42, R2-041729, Prague, Czech Republic, Aug. 16-20, 2004, Agenda Item: HSUPA(joint) 10.2.2.8.2, Source: Nortel Networks, Title: Node-B scheduler architecture proposal, Document for: Discussion and approval.

Search Report dated Jul. 2, 2008 in the counterpart European Patent application

The office communication dated Apr. 8, 2011, issued in the counterpart Chinese patent application.

ETSI 3rd Generation Partnership Project, Universal Mobile Telecommunications System (UMTS); Radio Resource Control (RRC) protocol specification (3GPP TS 25.331 version 6.2.0 Release 6), Jun. 2004, p. cover, 1-31, France, retrieved from http://www.etsi.org/deliver/etsi_ts/125300_125399/125331/06.02.00_60/ts_125331v060200p.pdf.

ETSI 3rd Generation Partnership Project, Universal Mobile Telecommunications System (UMTS); Radio Resource Control (RRC) protocol specification(3GPP TS 25.331 version 6.3.0 Release 6), Sep. 2004, p. cover,1-31, France, retrieved from http://www.etsi.org/deliver/etsi_ts/125300_125399/125331/06.03.00_60/ts_125331v060300p.pdf.

ETSI 3rd Generation Partnership Project, Universal Mobile Telecommunications System (UMTS); Radio Resource Control (RRC) protocol specification (3GPP TS 25.331 version 6.4.0 Release 6); Dec. 2004, p. cover, 1-33, and 258-259, France, retrieved from http://www.etsi.org/deliver/etsi_ts/125300_125399/125331/06.04.00_60/ts_125331v060400p.pdf.

* cited by examiner

FIG. 4

- SF1 → 2 → 4 → 8 → 16 → 32 → 64 → 128 → 256
- $C_{256,0}$ ← COMMON PILOT CHANNEL
- $C_{256,1}$ ← E-AGCH$_0$
- $C_{256,2}$ ← E-AGCH$_1$
- $C_{256,3}$ ⎫
- ... ⎬ OTHER CHANNELS
- $C_{256,256}$ ⎭

| TrBLK NUMBER | TrBLK SIZE |
|---|---|
| 0 | 336 |
| 1 | 656 |
| 2 | 976 |
| 3 | 1296 |
| 4 | 1616 |
| ⋮ | ⋮ |
| 32 | 19216 |

(b)

| MAXIMUM TRANSMISSION POWER RATIO NUMBER | MAXIMUM TRANSMISSION POWER RATIO (db) |
|---|---|
| 0 | -3 |
| 1 | -2 |
| 2 | -1 |
| 3 | 0 |
| 4 | 1 |
| ⋮ | ⋮ |
| 32 | 29 |

FIG. 6

| TrBLK NUMBER OR MAXIMUM TRANSMISSION POWER RATIO NUMBER | CODED BIT SEQUENCE |
|---|---|
| 0 | 00000000000000000000000000000000 |
| 1 | 00000000000000001111111111111111 |
| 2 | 00000000111111110000000011111111 |
| 3 | 00000000111111111111111100000000 |
| 4 | 00001111000011110000111100001111 |
| ⋮ | ⋮ |
| 32 | 01010101010101010101010101010101 |

MOBILE COMMUNICATION SYSTEM, WIRELESS CONTROL STATION, WIRELESS BASE STATION, MOBILE STATION, AND MOBILE COMMUNICATION METHOD

TECHNICAL FIELD

The present invention relates to a mobile communication system, a radio control station, a radio base station, a mobile station, and a mobile communication method.

BACKGROUND ART

Conventionally, in a mobile communication system, a radio control station is configured to determine a transmission rate of uplink user data, and to notify, to a base station and a mobile station, the determined transmission rate of uplink user data, by using a message of a layer 3 (RRC: Radio Resource Control layer), when setting a dedicated channel. After the setting of the dedicate channel, the radio control station is configured to control, depending on a change, of a status, the transmission rate of uplink user data.

In the case of data communication in particular, burst traffic may be caused with a higher probability than in the case of voice communication or video telephone communication. Thus, a high-speed change of a transmission rate has been desired.

However, a radio control station controls a great number of radio base stations, and thus a high-speed change of a transmission rate (e.g., about 1 to 100 milliseconds) is difficult from a viewpoint of a processing load and a processing delay for example. It may cause a risk of a significantly increased cost for an apparatus and cost for an operation of network lines to overcome the processing load and the processing delay.

Due to the above reason, the conventional mobile communication system has changed the transmission rate of uplink user data on an order of a few hundreds of milliseconds to few seconds. Specifically, when burst-like uplink user data must be transmitted as shown in FIG. 1(*a*), either of the methods shown in FIGS. 1(*b*) or 1(*c*) has been used.

The method shown in FIG. 1(*b*) is a method to provide a low transmission rate of uplink user data, whiling permitting a long delay and a low transmitting efficiency.

The method shown in FIG. 1(*c*) is a method to secure a resource (radio resource and hardware resource of radio base station) required for a high-speed transmission, and to provide a high-speed transmission rate of uplink user data, while permitting waste of a resource of an available time.

As described above, any of the methods has not been sufficient. Thus, a method for appropriately controlling a transmission rate of uplink user data while effectively using a radio resource has been discussed in the 3GPP and the 3GPP2 as international standardization organizations for the third generation mobile communication system.

Specifically, in a discussion which is called as the "Enhanced Uplink", the "Dedicated rate control" and the "Common rate control" have been suggested as a method for controlling a transmission rate of high-speed uplink user data in a layer 1 and a MAC sub layer between a radio base station and a mobile station.

The "Dedicated rate control" is a method wherein a radio base station determines, per a certain timing, transmission rates of uplink user data of the respective mobile stations, and notifies the respective mobile stations of the transmission rates by a general common channel (SCCPCH: Secondary Common Control Physical Channel).

The mobile stations transmit uplink user data at the determined transmission rates. The radio base station may always give all mobile stations connected to the radio base station transmission opportunities, or also may give some of the mobile stations transmission opportunities in turn.

Generally, a radio base station uses an UP/DOWN/KEEP command so as to change the transmission rate of uplink user data of a mobile station. However, a countermeasure by using this method to solve a problem (e.g., accumulation of received erroneous commands) also has been reported (e.g., see Non-patent Publication 1).

The "Common rate control" is a method wherein a radio base station notifies, as information common to mobile stations having communication, a transmission rate of uplink user data or information required for the calculation of the transmission rate (hereinafter referred to as "transmission rate information").

Based on the received transmission rate information, the respective mobile stations determine the transmission rate of uplink user data. The "Common rate control" can be realized, for example, by setting identifiers "Common" showing all users existing in a plurality of cells to the UE-ID (User Equipment-ID) to be set to the SCCPCH.

Another method has been suggested by which a total transmission rate common to the respective cells is periodically updated and is transmitted in the SCCPCH, and a share of a transmission rate of uplink user data of each mobile station is transmitted in a dedicated channel, so that a radio resource can be effectively used (e.g., see Non-patent Publication 2).

(Non-patent Publication 1) 3GPP TSG-RAN WG1 R1-030709

(Non-patent Publication 2) 3GPP TSG-RAN WG1 R2-041729

However, any of the conventionally suggested methods for controlling a transmission rate of uplink user data has used the SCCPCH. Since the SCCPCH can be flexibly used for various applications, a tendency is caused in which a great number of overheads (e.g., Transport Format Combination Indicator (TFCI)) are added.

Due to this reason, the SCCPCH has been further added with control data for the control of a transmission rate of uplink user data (e.g., setting of the identifier "Common" to the UE-ID) to cause an increased downlink transmission power, thus causing a risk of a restricted downlink capacity.

In the case where a priority class is provided in particular, a need to transmit transmission rate information for every priority class by the SCCPCH has been caused, thus causing a risk of a further increase of a downlink transmission power and a further restriction of a downlink capacity.

Furthermore, the SCCPCH uses a turbo code and a convolutional code. Thus, transmission rate information could not include higher-order bits and lower-order bit having different qualities. Thus, when a bit error is caused, an increased error may have been caused between the information and correct transmission.

DISCLOSURE OF THE INVENTION

The present invention has been made in view of the above. It is an objective of the present invention to provide a mobile communication system, a radio control station, a radio base station, a mobile station, and a mobile communication method by which an influence on a downlink can be suppressed and a transmission rate of uplink user data can be appropriately controlled.

A first aspect of the present invention is summarized as a mobile communication system, including: a transmission section configured to transmit to a mobile station an exclusive channel for notifying the mobile station of transmission rate information regarding a transmission rate of user data of an uplink channel; and a transmission rate control section configured to determine transmission rate information to be used by the mobile station, and to instruct the mobile station to receive the exclusive channel for notifying the determined transmission rate information; wherein: the transmission section is configured to transmit the exclusive channel for notifying the mobile station of the determined transmission rate information.

In the first aspect of the present invention, the transmission rate control section can be configured to instruct the mobile station to receive the exclusive channel for notifying the determined transmission rate information, by notifying a code of the exclusive channel.

In the first aspect of the present invention, the transmission rate control section can be configured to determine transmission rate information to be used by the mobile station, based on at least one of a priority of communication performed by the mobile station or an interference amount.

In the first aspect of the present invention, the transmission section can be configured to transmit a correspondence between a priority of communication and the exclusive channel.

In the first aspect of the present invention, the transmission section can be configured to transmit the exclusive channel in which lower-order bits have higher redundancy than that of higher-order bits.

A second aspect of the present invention is summarized as a radio control station, including: a base station control section configured to control a radio base station so as to transmit, to a mobile station, an exclusive channel for notifying the mobile station of transmission rate information regarding a transmission rate of user data of an uplink channel; and a transmission rate control section configured to determine transmission rate information to be used by the mobile station, and to instruct the mobile station to receive the exclusive channel for notifying the determined transmission rate information; wherein: the base station control section is configured to control the radio base station so as to transmit the exclusive channel for notifying the mobile station of the determined transmission rate information.

In the second aspect of the present invention, the transmission rate control section can be configured to instruct the mobile station to receive the exclusive channel for notifying the determined transmission rate information, by notifying a code of the exclusive channel.

In the second aspect of the present invention, the base station control section can be configured to notify the radio base station of a code of the exclusive channel, when controlling the radio base station so as to transmit to the mobile station, the exclusive channel for notifying the determined transmission rate information.

In the second aspect of the present invention, the base station control section can be configured to control the radio base station so as to transmit, the mobile station, a correspondence between a priority of communication and the exclusive channel.

A third aspect of the present invention is summarized as a radio base station, including: a transmission section configured to transmit to a mobile station an exclusive channel for notifying the mobile station of transmission rate information regarding a transmission rate of user data of an uplink channel; wherein: the transmission section is configured to transmit, to every the mobile station, the exclusive channel for notifying transmission rate information to be used by the mobile station, by using a code notified from a radio control station.

In the third aspect of the present invention, the transmission section can be configured to transmit a correspondence between a priority of communication and the exclusive channel.

A fourth aspect of the present invention is summarized as a mobile station, including: a reception section configured to receive an exclusive channel for notifying a mobile station of transmission rate information regarding a transmission rate of user data of an uplink channel; and a transmission section configured to transmit the user data, by using the transmission rate information notified by the exclusive channel.

In the fourth aspect of the present invention, the reception section can be configured to receive the exclusive channel transmitted by every mobile station, by using a code notified from a radio control station.

In the fourth aspect of the present invention, the reception section can be configured to receive a correspondence between a priority of communication and the exclusive channel, and to receive, based on the correspondence, the exclusive channel.

A fifth aspect of the present invention is summarized as a mobile communication method, including the steps of: transmitting, to a mobile station, an exclusive channel for notifying the mobile station of transmission rate information regarding a transmission rate of user data of an uplink channel; and determining transmission rate information to be used by the mobile station; and instructing the mobile station to receive the exclusive channel for notifying the determined transmission rate information; wherein: in the transmission step, the exclusive channel for notifying the determined transmission rate information is transmitted to the mobile station.

BRIEF DESCRIPTION OF THE DRAWINGS

FIG. 4 is a diagram showing a correspondence between downlink channels and codes to be used in the mobile communication system according to one embodiment of the present invention.

FIG. 5(*a*) is a diagram showing a correspondence between TrBLK numbers and TrBLK sizes toe be used in the mobile communication system according to one embodiment of the present invention. FIG. 5(*b*) is a diagram showing a correspondence between transmission power ratio numbers and transmission power ratios toe be used in the mobile communication system according to one embodiment of the present invention.

FIG. 6 is a diagram showing a correspondence between TrBLK numbers or transmission power ratio numbers and coded bit sequences to be used in the mobile communication system according to one embodiment of the present invention.

BEST MODE FOR CARRYING OUT THE INVENTION (Configuration of a Mobile Communication System According to a First Embodiment of the Present Invention)

Figure 1:
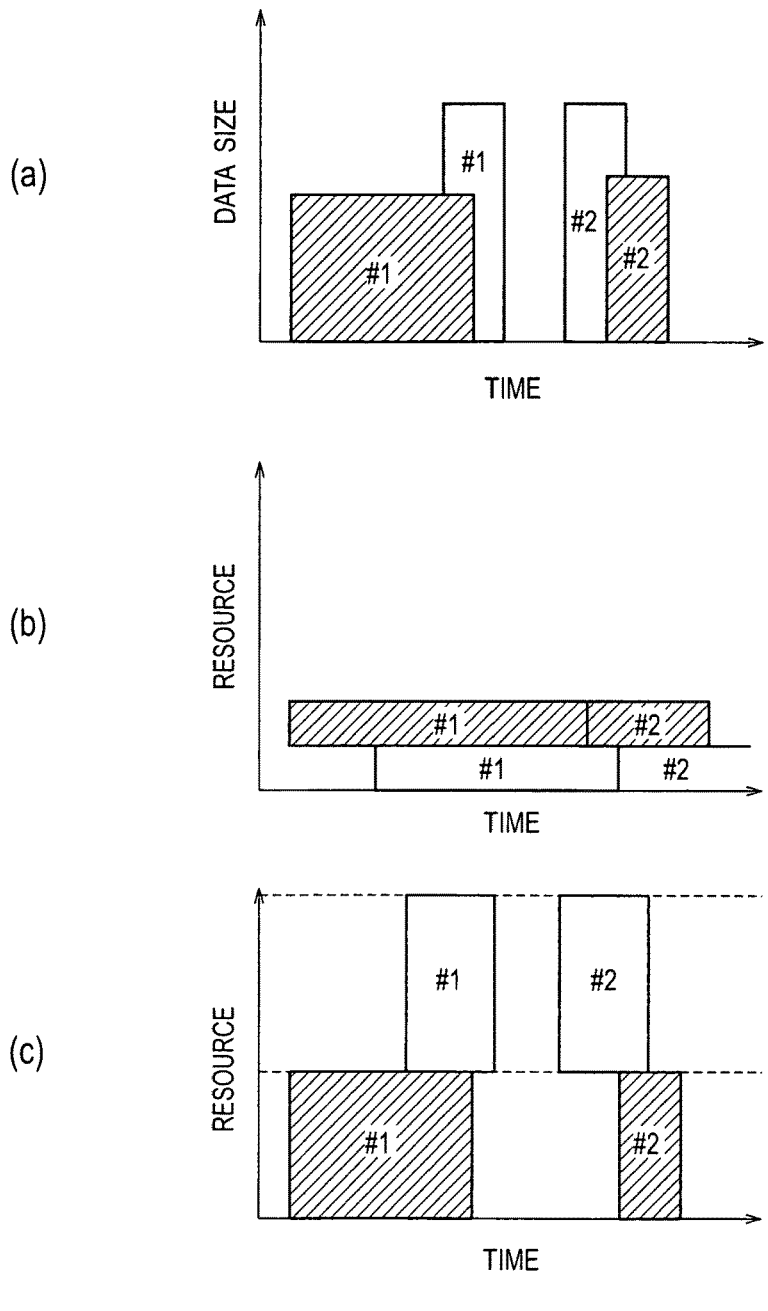
FIGS. 1(*a*) to 1(*c*) are diagrams for explaining transmission rate control performed by a conventional mobile communication system.
Figure 2:
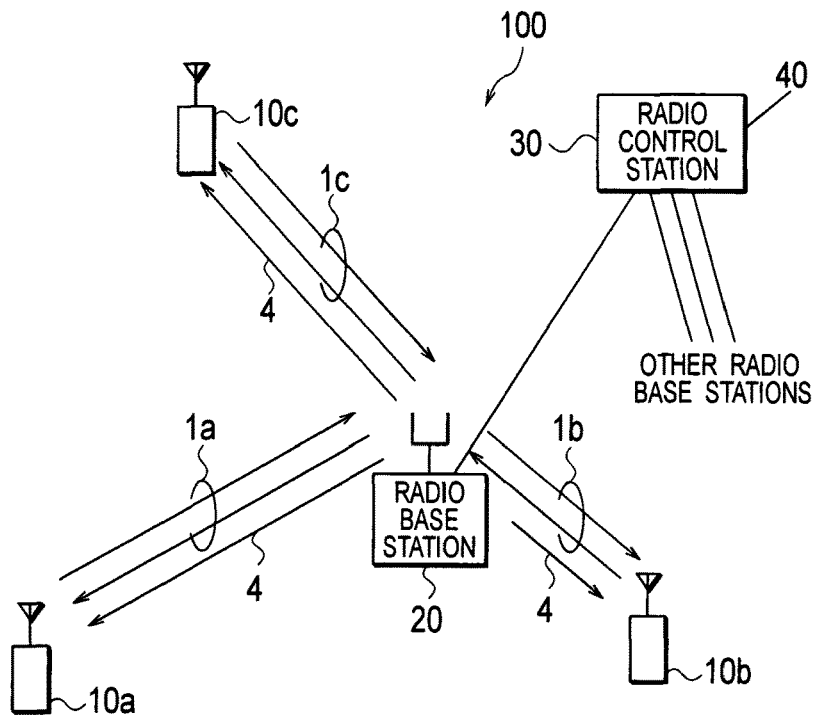
FIG. 2 is an entire configuration diagram of a mobile communication system according to one embodiment of the present invention.

As shown in FIG. 2, a mobile communication system 100 according to a first embodiment of the present invention includes: a plurality of mobile stations 10a, 10b, and 10c; a radio base station 20; a radio control station 30; and an exchange network 40. The mobile communication system 100 uses the Code Division Multiple Access (CDMA) as a radio access method between the mobile stations 10a to 10c and the radio base station 20.

The mobile stations 10a to 10c are configured to use radio channels to transmit and receive user data and control data to and from the radio base station 20, respectively.

The radio channels include uplink channels for transmitting uplink data from the mobile stations 10a to 10c to the radio base station 20, and downlink channels for transmitting downlink data from the radio base station 20 to the mobile stations 10a to 10c.

The radio channels include dedicated channels 1a to 1c dedicated to the respective mobile stations 10a to 10c, and a common channel common to the plurality of mobile stations 10a to 10c. The dedicated channels 1a to 1c are bi-directional channels individually allocated to the respective mobile stations 10a to 10c. The term "bi-directional channel" means a channel including an uplink channel and a downlink channel.

Figure 3:
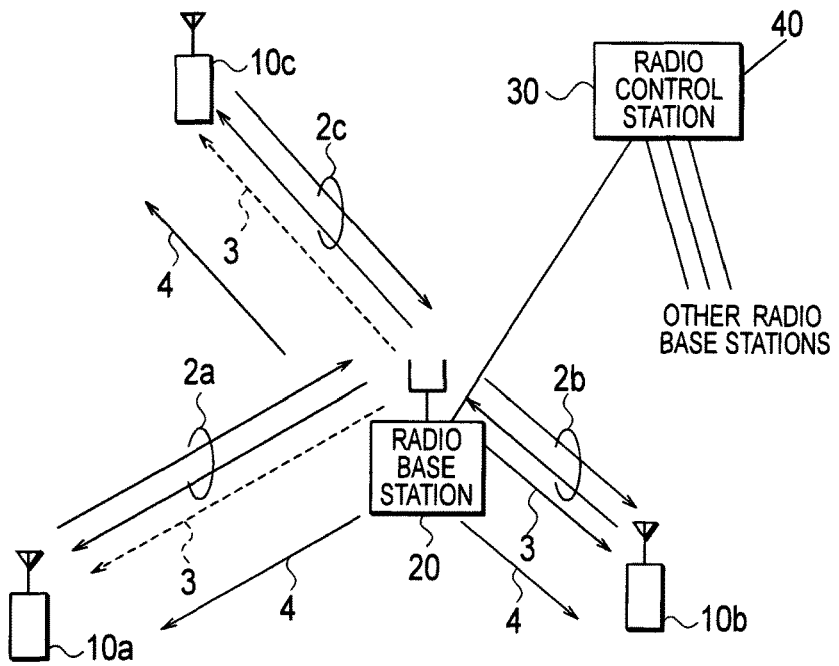
FIG. 3 is a diagram for explaining a channel configuration to be used by the mobile communication system according to one embodiment of the present invention.

Other radio channels also may be used such as a downlink common channel 3 and associated dedicated channels 2a to 2c which are associated with the downlink common channel 3 as shown in FIG. 3. The downlink common channel 3 is a common channel of a high-speed downlink and may be a High Speed-Downlink Shared Channel (HS-DSCH) standardized in the 3GPP, for example. User data and control data in a downlink direction is mainly transmitted via the downlink common channel 3.

The associated dedicated channels 2a to 2c are bi-directional channels that are individually allocated by the downlink common channels 3 to the respective mobile stations 10a to 10c having communication therewith. The uplink channels of the associated dedicated channels 2a to 2c are used to transmit user data, pilot symbols, transmission power control commands (TPC) used for the downlink channel transmission of the associated dedicated channels 2a to 2c, and downlink quality information used for scheduling information, applied modulation, or coding of the downlink common channel 3, for example. The downlink channels of the associated dedicated channels 2a to 2c are used to transmit transmission power control commands (TPC) for example used for the uplink channel transmission of the associated dedicated channels 2a to 2c. It is noted that the downlink common channel 3 shown by the dotted line of FIG. 3 represents that the downlink common channel 3 is not allocated to the mobile station 10b.

In the mobile communication system 100, exclusive channels 4 for notifying mobile stations of transmission rate information regarding transmission rates of uplink channel user data are transmitted to the mobile stations 10a to 10c. The exclusive channels 4 are downlink channels.

For example, in FIG. 2, the exclusive channels 4 notify transmission rate information regarding transmission rates of uplink channel user data in the dedicated channel 1a to 1c. In FIG. 3, the exclusive channels 4 notify transmission rate information regarding transmission rates of uplink channel user data in the associated dedicated channels 2a to 2c. It is noted that uplink channels used for the transmission of user data are not limited to those shown in FIG. 2 and FIG. 3 and also may be various uplink channel.

The radio base station 20 has radio communication with the mobile stations 10a to 10c. The radio control station 30 controls the mobile stations 10a to 10c and radio base station 20, and controls the radio communication between the mobile stations 10a to 10c and radio base station 20. The radio control station 30 is located at the upstream of the radio base station 20. The exchange network 40 is a core network including an exchange.

Next, the exclusive channel 4 will be described in details.

The exclusive channel 4 is preferably provided to every piece of transmission rate information to be notified. For example, the exclusive channels 4 include an exclusive channel 4 for notifying of transmission rate information having a "high" priority class and an exclusive channel 4 for notifying of transmission rate information having a "low" priority class.

The exclusive channels 4 for the respective pieces of transmission rate information (exclusive channels 4 for notifying the respective pieces of transmission rate information) are preferably provided to correspond to priorities of communication performed by mobile stations.

For example, the priorities of communication performed by mobile stations may be priorities set based on the Quality Of Service (QoS) of uplink user data transmitted from mobile stations, the contents of a communication service covered by a contract of a user of a mobile station, or the like.

For example, the exclusive channel 4 may be an Enhanced Absolute Grant Channel (E-AGCH) or a Common Rate Grant Channel (CRGCH).

FIG. 4 illustrates a relation between Orthogonal Variable Spreading Factor (OVSF) codes (spread codes) and downlink channels allocated with the respective codes.

For example, when the maximum number of priority classes that the mobile communication system 100 can set is eight, the mobile communication system 100 may set eight or less priority classes and is not always required to set eight priority classes.

In FIG. 4, the maximum number of priority classes that can be set is eight. However, FIG. 4 shows a case where two priority classes of a priority class "high" having a high priority and a priority class "low" having a low priority are set.

In this case, the mobile communication system 100 provides an E-AGCH$_0$ for notifying transmission rate information for a priority class "high" and an E-AGCH$_1$ for notifying f transmission rate information for a priority class "low", as exclusive channels (E-AGCH) for notifying transmission rate information.

As described above, the respective exclusive channels of transmission rate information are provided to correspond to communication priorities. The E-AGCH$_0$ having a priority class "high" notifies a higher transmission rate than that of the E-AGCH$_1$ having a priority class "low". On the other hand, the E-AGCH$_1$ having a priority class "low" notifies a lower transmission rate than that of the E-AGCH$_0$ having a priority class "high". Thus, a different communication can be provided depending on a priority class.

In the example of FIG. 4, code $C_{256,1}$ and $C_{256,2}$ are allocated to the E-AGCH$_0$ and the E-AGCH$_1$, respectively. A code $C_{256,0}$ is allocated to a common pilot channel. Codes $C_{256,3}$ to $C_{256,256}$ are allocated to channels other than the common pilot channel and the E-AGCH.

The exclusive channel (E-AGCH) can be used to notify, as transmission rate information, for example, a transport Block (hereinafter referred to as "TrBLK") size. A TrBLK size is a data size in one Transmission Time Interval (hereinafter referred to as "TTI").

It is noted that, as shown in FIG. 5(a), the mobile stations 10a to 10c preferably maintain the correspondences between TrBLK numbers and TrBLK sizes. In this case, the radio base station 20 only has to transmit a TrBLK number as transmission rate information via the exclusive channel (E-AGCH). Thus, an amount of data in the downlink can be reduced.

The exclusive channel (E-AGCH) also can be used to transmit, as transmission rate information, the maximum allowable transmission rate, the maximum allowable transmission power, or the maximum allowable transmission power ratio between dedicated physical channels for example.

For example, as the maximum allowable transmission power, the maximum allowable transmission power of an Enhanced-Dedicated Physical Data Channel (E-DPDCH) and the like can be used, and, as the maximum allowable transmission power ratio between dedicated physical channels, the maximum allowable transmission power ratio between a Dedicated Physical Control Channel (DPCCH) and an E-DPDCH can be used.

In such a case, the mobile stations 10a to 10c preferably maintain, as shown in FIG. 5(b), a correspondence between the maximum transmission power ratio numbers and the maximum transmission power ratios. In this case, the radio base station 20 only has to transmit the maximum transmission power ratio number as transmission rate information via the exclusive channel (E-AGCH). Thus, an amount of data in the downlink can be reduced.

As described above, transmission rate information is any information that is for a transmission rate of user data of an uplink channel and that can be used for a transmission rate itself or for the determination of a transmission rate. It is noted that the E-DPDCH is a dedicated channel used to transmit user data based on an high efficiency transmission method (Enhanced Uplink). The DPCCH is a dedicated channel to transmit control data.

An exclusive channel (E-AGCH) is preferably configured so that higher-order bits have a higher redundancy than that of lower-order bits.

According to this, when an error-correcting coding of a signal is performed by an exclusive channel, higher-order bits have a higher redundancy than that of lower-order bits. This can reduce an error in a transmission rate due to an error in the notification of transmission rate information.

The transmission of a TrBLK number or the maximum transmission power ratio number via the exclusive channel (E-AGCH) is performed by transmitting a bit sequence obtained by coding a TrBLK number or the maximum transmission power ratio number as shown in FIG. 6 via the exclusive channel (E-AGCH).

FIG. 6 illustrates a correspondence between the TrBLK number or the maximum transmission power ratio number and a coded bit sequence. FIG. 6 shows a case where an orthogonal code (32, 5) is used as a spread code.

When the number of symbols of user data in a TTI is 30 bits for example, low order two bits may be punctured and a coding rate of uncoded higher-order bits may be higher than a coding rate of uncoded lower-order bits. Although the above example showed no significant difference in the coding rate between the higher-order bits and the lower-order bit, a larger difference in the coding rate also may be given.

An exclusive channel (E-AGCH) is configured to notify an absolute value (e.g., transmission rate or a transmission power ratio between an E-DPDCH and a DPCCH) to a mobile station.

When high-order bits include an error in this case, a significant impact is caused on the error. For example, when "10101" is transmitted and "10100" is received, an influence by the error is small. However, when "10101" is transmitted and "00101" is received, this one bit error causes a significant impact on the system.

Thus, an approach may be considered in which high-order bits having higher redundancy are transmitted. A specific example thereof will be described.

Figure 7:
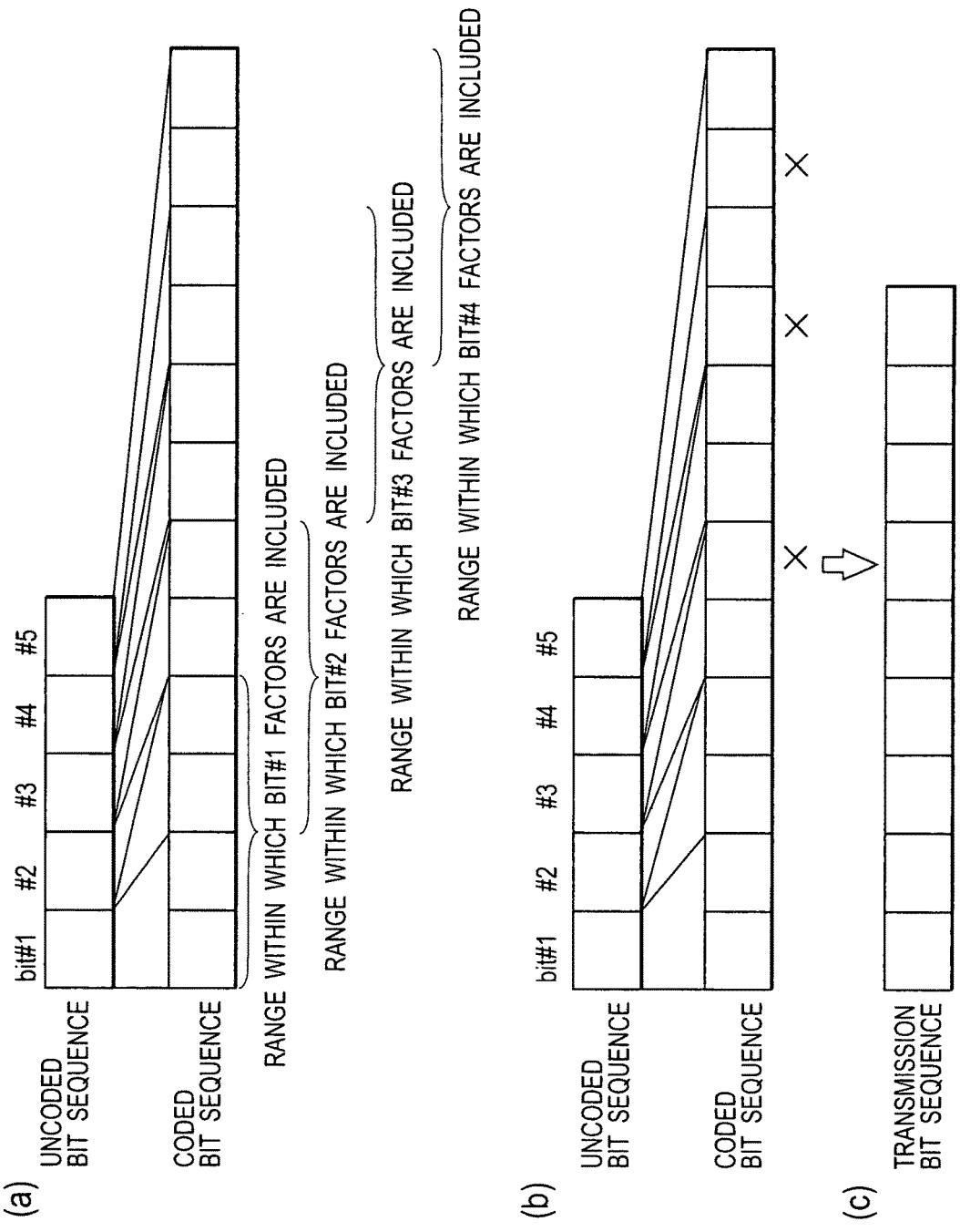
FIGS. 7(a) and 7(b) are diagrams showing an E-AGCH format to be used in the mobile communication system according to one embodiment of the present invention.

As shown in FIG. 7(a), in a general coding, uncoded bits are equally dispersed in coded bits.

On the other hand, as shown in FIG. 7(b) and FIG. 7(c), lower bits among coded bits can be thinned out to relatively increase the redundancy of high-order bits.

Figure 8:
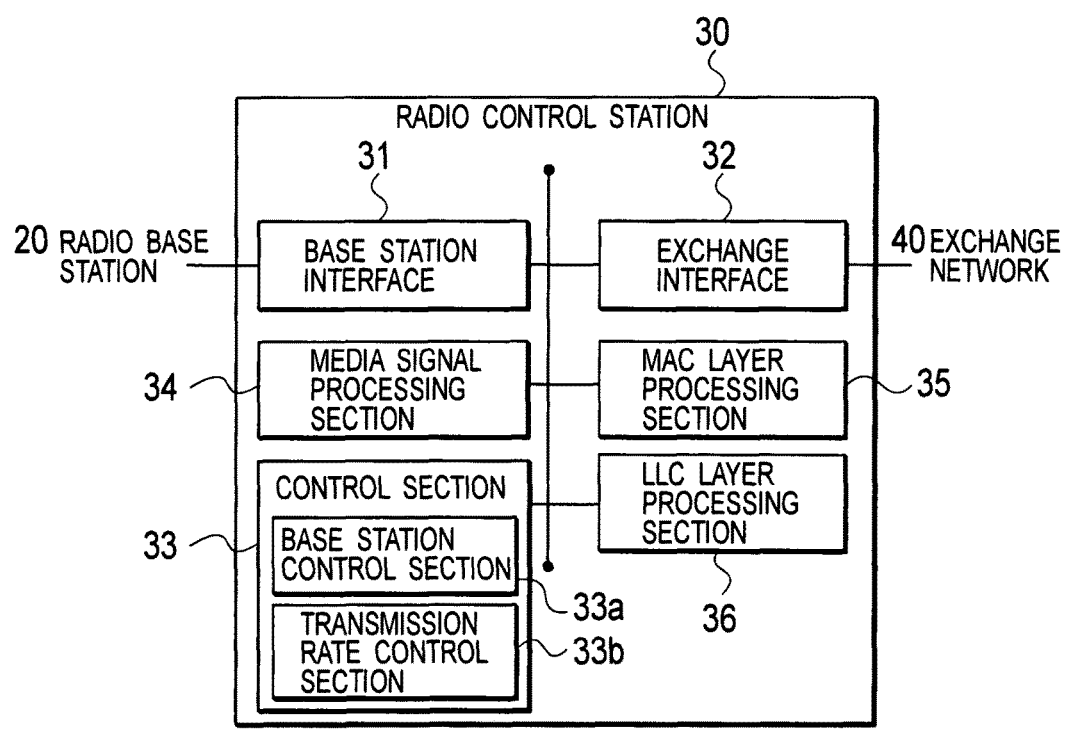
FIG. 8 is a block diagram illustrating the structure of a radio control station according to one embodiment of the present invention.

Next, the radio control station 30, the radio base station 20, and the mobile stations 10a to 10c will be described in detail. As shown in FIG. 8, the radio control station 30 includes: a base station interface 31, an exchange interface 32, a control section 33, a media signal processing section 34, a MAC layer processing section 35, and a LLC layer processing section 36.

The base station interface 31 is an interface to the radio base station 20. The base station interface 31 transmits and receives control data and user data to and from the radio base station 20. The exchange interface 32 is an interface to the exchange network 40. The exchange interface 32 transmits and receives control data and user data to and from the exchange network 40.

The media signal processing section 34 is configured to perform a signal processing of audio data or video data for example. The MAC layer processing section 35 is configured to perform a processing in a Medium Access Control (MAC) layer. The LLC layer processing section 36 is configured to perform a processing in a Logical Link Control (LLC) sub layer.

Downlink user data to be transmitted via a downlink channel to the mobile stations 10a to 10c is subjected to a processing as described below.

The exchange interface 32 receives user data from the exchange network 40. The exchange interface 32 inputs the received user data to the LLC layer processing section 36. With regards to the received downlink user data, the LLC layer processing section 36 performs a processing of the LLC sub layer (e.g., addition of a LLC header, synthesis of trailer). When the received downlink user data is audio data, video data or the like, the exchange interface 32 inputs the downlink user data to the media signal processing section 34.

The LLC layer processing section 36 and the media signal processing section 34 input the processed downlink user data to the MAC layer processing section 35. The MAC layer processing section 35 performs a processing in the MAC layer (e.g., priority control, addition of MAC header) The MAC layer processing section 35 inputs the processed downlink user data to the base station interface 31. The base station interface 31 transmits the downlink user data received from the exchange network 40 to the radio base station 20.

Uplink user data to be transmitted via an uplink channel from the mobile stations 10*a* to 10*c* is subjected to a processing in an opposite direction as that for a downlink channel.

Specifically, the base station interface 31 receives uplink user data from the radio base station 20. The base station interface 31 inputs the received uplink user data to the MAC layer processing section 35. With regard to the received uplink user data, the MAC layer processing section 35 performs a processing of the MAC layer. The MAC layer processing section 35 inputs the processed uplink user data to the media signal processing section 34 or the LLC layer processing section 36.

The LLC layer processing section 36 and the media signal processing section 34 performs a processing for a LLC sub layer and a media signal processing with regard to the respective pieces of uplink user data. The LLC layer processing section 36 and the media signal processing section 34 input the processed uplink user data to the exchange interface 32. The exchange interface 32 transfers the uplink user data received from the radio base station 20 to the exchange network 40.

The control section 33 is configured to perform a call control including a calling control, a called control and the like, to control the setting or release of a channel in the layer 3 H and the like.

The control section 33 is configured to set a priority class. The control section 33 sets, via the base station interface 31 and the exchange interface 32, a priority class in the mobile communication system 100 with the radio base station 20 and the exchange network 40. Then, when the control section 33 receives a call from the mobile stations 10*a* to 10*c*, the control section 33 determines a priority class of communication to be started by the call. Thereafter, the control section 33 notifies the priority class determined as a message in the layer 3, to the mobile stations 10*a* to 10*c*.

As shown in FIG. 8, the control section 33 includes a base station control section 33*a* and a transmission rate control section 33*b*.

The base station control section 33*a* controls the radio base station 20 so as to transmit the exclusive channel (E-AGCH) for notifying a mobile station of transmission rate information, to the mobile stations 10*a* to 10*c*.

When the exclusive channel (E-AGCH) is provided per every piece of transmission rate information, the base station control section 33*a* can control the radio base station 20 so as to transmit a correspondence between a priority of communication and the exclusive channel (E-AGCH) to the mobile stations 10*a* to 10*c*.

Specifically, the transmission rate control section 33*b* sets transmission rate information for every priority class. The transmission rate control section 33*b* sets the exclusive channel (E-AGCH) for every set transmission rate information (i.e., for every priority class). The transmission rate control section 33*b* allocates a code to the exclusive channel (E-AGCH).

For example, the transmission rate control section 33*b* sets transmission rate information having a priority class "high" and transmission rate information having a priority class "low". The transmission rate control section 33*b* sets "E-AGCH$_0$" as an exclusive channel to the transmission rate information having the priority class "high", and sets "E-AGCH$_1$" as an exclusive channel to the transmission rate information having the priority class "low".

As shown in FIG. 4, the transmission rate control section 33*b* allocates a code $C_{256,1}$ to "E-AGCH$_0$" and allocates a code $C_{256,2}$ to "E-AGCH$_1$".

As described above, the transmission rate control section 33*b* allocates a code to an E-AGCH so that it is an exclusive channel for every piece of transmission rate information.

Then, the base station control section 33*a* and the transmission rate control section 33*b* maintain a correspondence between a downlink channel and a code as shown in FIG. 4.

The base station control section 33*a* and the transmission rate control section 33*b* maintain a correspondence between a priority class and an exclusive channel (E-AGCH). It is noted that the transmission rate control section 33*b* also may periodically update transmission rate information to be notified by the respective exclusive channels (E-AGCH$_0$ and E-AGCH$_1$).

The base station control section 33*a* notifies the radio base station 20 of the code $C_{256,1}$ and code $C_{256,2}$ allocated to the exclusive channels the E-AGCH$_0$ and the E-AGCH$_1$, and instructs the radio base station 20 to transmit the exclusive channel (E-AGCH$_0$ and E-AGCH$_1$), to all of the mobile stations 10*a* to 10*c*.

In this case, the base station control section 33*a* notifies the radio base station 20 of a correspondence between the priority class "high" and the E-AGCH$_0$ and a correspondence between the priority class "low" and the E-AGCH$_1$, and instructs the radio base station 20 to transmit a correspondence between the priority class and the exclusive channel, to all of the mobile stations 10*a* to 10*c*.

Alternatively, when the exclusive channel (E-AGCH) is provided for every piece of transmission rate information, the transmission rate control section 33*b* also may determine transmission rate information to be used by the respective mobile stations 10*a* to 10*c*, and instructs the respective mobile stations 10*a* to 10*c* to receive the exclusive channel (E-AGCH) for notifying the determined transmission rate information.

In this case, the base station control section 33*a* controls the radio base station 20 to transmit, to the respective mobile stations, the exclusive channel (E-AGCH) for notifying of the determined transmission rate information of the respective mobile stations.

When the transmission rate control section 33*b* receives from the mobile stations 10*a* to 10*c* a request for setting an uplink channel for transmitting uplink user data, a location registration request from the mobile stations 10*a* to 10*c*, or the like, the transmission rate control section 33*b* can determine, based on priority classes of communication to be performed by the mobile stations 10*a* to 10*c*, transmission rate information to be used by the mobile stations 10*a* to 10*c*.

Specifically, the transmission rate control section 33*b* can determine transmission rate information, when the mobile stations 10*a* to 10*c* start the transmission of uplink user data, or establish the connection with the radio base station 20.

The transmission rate control section 33b also may determine transmission rate information for every mobile station, or may determine transmission rate information for each of a plurality of mobile station groups belonging to a single priority class so as to collectively determine transmission rate information for a plurality of mobile stations.

When the transmission rate control section 33b receives a channel setup request or a location registration request or after the start of communication, the transmission rate control section 33b also may determine, based on an interference amount of an uplink channel used by the mobile stations 10a to 10c, transmission rate information to be used by the mobile stations 10a to 10c.

As the Interference amount (noise rise), for example, an interference power, a Carrier to Interference Ratio (CIR), a Signal to Interference Ratio (SIR), or a Signal to Noise (SN) ratio can be used. The transmission rate control section 33b can obtain an interference amount from the radio base station 20.

Figure 9:
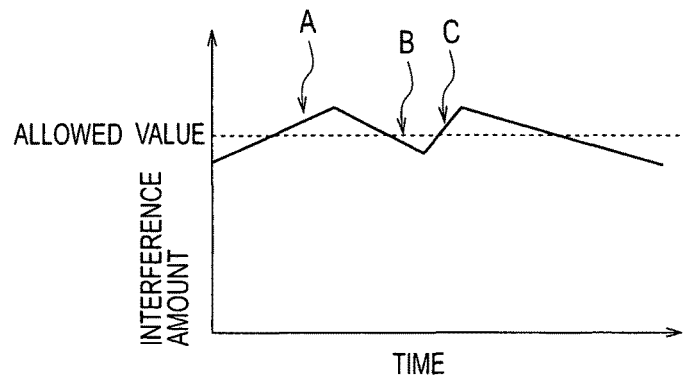
FIG. 9 is a diagram for showing a variation in an interference amount by transmission rate control performed by the mobile communication system according to one embodiment of the present invention.

For example, as shown by the arrow A in FIG. 9, when an interference amount exceeds an allowed value shown by the dotted line, the transmission rate control section 33b changes transmission rate information so that the mobile stations 10a to 10c having communication have a lower transmission rate than the current one.

Thereafter, as shown by the arrow B of FIG. 9, when an interference amount is lower than the allowed value so as to cause a margin, the transmission rate control section 33b changes the transmission rate information so that the mobile stations 10a to 10c having communication have a higher transmission rate than the current one.

Again, as shown by the arrow C in FIG. 9, when the interference amount exceeds the allowed value, the transmission rate control section 33b changes the transmission rate information again so that the mobile stations 10a to 10c having communication have a lower transmission rate than the current one.

It is noted that the vertical axis in FIG. 9 represents an interference amount while the horizontal axis represents time.

As described above, it is possible to realize an efficient use of an uplink channel so as to provide an efficient transmission of uplink user data, by control so that the mobile stations 10a to 10c can use the transmission rate at a maximum within a range in which the interference amount does not exceed the allowed value.

The transmission rate control section 33b also can determine transmission rate information to be notified to the respective mobile stations 10a to 10c, not only based on a priority class and an interference amount, but also based on a radio resource of the radio base station 20 connected to the mobile stations 10a to 10c, the transmission power or transmission processing capability of the mobile stations 10a to 10c, or a transmission rate required by a higher-order communication application.

As described above, the mobile communication system 100 can appropriately control a transmission rate in consideration of a priority of communication, an interference amount, or the like.

Then, the transmission rate control section 33b notifies the mobile stations 10a to 10c of the exclusive channel (E-AGCH) for notifying the determined transmission rate information, and instructs the mobile stations 10a to 10c to receive only the channel as an exclusive channel (E-AGCH).

Specifically, the transmission rate control section 33b performs a reception instruction to specify, via the radio base station 20, exclusive channels to be received by the mobile stations 10a to 10c.

Furthermore, the base station control section 33a notifies the radio base station 20 of the exclusive channel (E-AGCH) for notifying the transmission rate information determined by the transmission rate control section 33b, and instructs the radio base station 20 to transmit the E-AGCH to the mobile stations 10a to 10c.

For example, when a priority of communication class of the mobile station 10a is "high", the transmission rate control section 33b notifies the mobile station 10a, via the radio base station 20, of the code $C_{256,1}$ of the E-AGCH$_0$, and instructs the mobile station 10a to receive the E-AGCH$_0$.

Furthermore, the base station control section 33a notifies the radio base station 20 of the code $C_{256,1}$ of the E-AGCH$_0$, and instructs the radio base station 20 to transmit the E-AGCH$_0$ to the mobile station 10a.

Alternatively, when the interference amount of the mobile station 10a exceeds the allowed value, the transmission rate control section 33b notifies the mobile station 10a via the radio base station 20 of the code $C_{256,2}$ of the E-AGCH$_1$ for notifying transmission rate information for providing a lower transmission rate than the current one. As a result, the transmission rate control section 33b instructs the mobile station 10a change an exclusive channel to be received to the E-AGCH$_1$ as.

Furthermore, the base station control section 33a notifies the radio base station 20 of the code $C_{256,2}$ of the E-AGCH$_1$, and instructs the radio base station 20 to change the E-AGCH to be transmitted to the mobile station 10a to the E-AGCH$_1$. It is noted that an instruction an the like from the control section 33 to the radio base station 20 as described above is transmitted as control data via the base station interface 31 to the radio base station 20.

Figure 10:
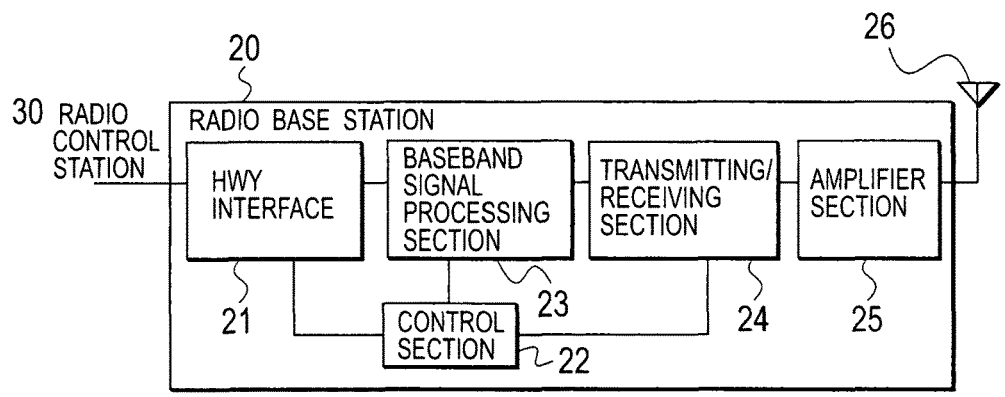
FIG. 10 is a block diagram illustrating the structure of a radio base station according to one embodiment of the present invention.

As shown in FIG. 10, the radio base station 20 includes: a HWY interface 21; a control section 22; a baseband signal processing section 23; a transmitting/receiving section 24: an amplifier section 25; and a transmitting/receiving antenna 26.

The HWY interface 21 is an interface to the radio control station 30. The HWY interface 21 is configured to transmit and receive control data and user data to and from the radio control station 30.

The baseband signal processing section 23 is configured to perform a signal processing for user data and control data to be transmitted to the mobile stations 10a to 10c, and a signal processing for baseband signals received from the mobile stations 10a to 10c. The signal processing performed by the baseband signal processing section 23 is a signal processing in the layer 1.

The transmitting/receiving section 24 is configured to transmit and receive user data and control data to and from the mobile stations 10a to 10c via radio. The amplifier section 25 is configured to amplify a signal, and to transmit and receive, via the transmitting/receiving antenna 26, a signal to and from the mobile stations 10a to 10c.

Data to be transmitted via a downlink channel to the mobile stations 10a to 10c (downlink user data and control data) is subjected to a processing as described below.

The HWY interface 21 receives, from the radio control station 30, downlink user data to be transmitted via a downlink channel to the mobile stations 10a to 10c, and inputs the data to the baseband signal processing section 23. The control section 22 inputs, via the downlink channel, control data to be transmitted to the mobile stations 10a to 10c to the baseband signal processing section 23. The baseband signal processing section 23 performs a signal processing (e.g., error-correcting coding, data modulation, spreading) with regard to the data.

The baseband signal processing section 23 inputs the baseband signal having been subjected to the signal processing to the transmitting/receiving section 24. The transmitting/receiving section 24 converts the baseband signal to a signal having a radio frequency band. The transmitting/receiving section 24 inputs the converted signal to the amplifier section 25 to transmit, via the amplifier section 25 and the transmitting/receiving antenna 26, the signal to the mobile stations 10a to 10c. The amplifier section 25 amplifies the signal, and transmits the signal via the transmitting/receiving antenna 26 to the mobile stations 10a to 10c.

Data to be transmitted via an uplink channel from the mobile stations 10a to 10c (uplink user data and control data) is subjected to a processing as described below.

The amplifier section 25 amplifies a signal received by the transmitting/receiving antenna 26, and inputs the signal to the transmitting/receiving section 24. The transmitting/receiving section 24 receives signals from the mobile stations 10a to 10c via the transmitting/receiving antenna 26 and the amplifier section 25. The transmitting/receiving section 24 converts the received signal to a baseband signal, and inputs the baseband signal to the baseband signal processing section 23. Specifically, the transmitting/receiving section 24 performs a detection, filtering, quantization processing and the like with regard to the received signal, so as to extract a baseband signal.

The baseband signal processing section 23 performs a signal processing (e.g., despreading, RAKE synthesis, error-correcting decoding) with regard to the baseband signal. The baseband signal processing section 23 inputs the uplink user data having been subjected to the signal processing to the HWY interface 21, and inputs control data having been subjected to the signal processing to the control section 22. The HWY interface 21 transfers the uplink user data to the radio control station 30. It is noted that a MAC-e function operates the baseband signal processing section 23 in the transfer of the uplink user data via the HWY interface 23 to the radio control station 30.

The control section 22 performs various controls including a call control (e.g., a calling control, a called control). The control section 22 manages the statuses of the baseband signal processing section 23 and the transmitting/receiving section 24 in the radio base station 20, and allocates hardware resource by the layer 3, and the like. The control section 22 communicates control data for the call control ant the like with the mobile stations 10a to 10c via the baseband signal processing section 23, the transmitting/receiving section 24, and the amplifier section 25. The control section 22 communicates control data for the call control and the like with the radio control station 30 via the HWY interface 21.

The transmitting/receiving section 24 functions as a transmission section that transmits, to the mobile stations 10a to 10c, an exclusive channel (E-AGCH) for notifying a mobile station of transmission rate information regarding a transmission rate of user data of an uplink channel.

Furthermore, when the exclusive channel 4 is provided for every piece of transmission rate information, the transmitting/receiving section 24 can transmit a correspondence between a priority of communication and the exclusive channel (E-AGCH).

For example, the control section 22 is notified, from the base station control section 33a of the radio control station 30, of the code $C_{256,1}$ and the code $C_{256,2}$ allocated to the exclusive channels $E\text{-AGCH}_0$ and $E\text{-AGCH}_1$, so as to receive an instruction to transmit the exclusive channel ($E\text{-AGCH}_0$ and $E\text{-AGCH}_1$).

Based on the instruction, the control section 22 instructs the transmitting/receiving section 24 to transmit the exclusive channel ($E\text{-AGCH}_0$ and $E\text{-AGCH}_1$). Based on the instruction from the control section 22, the transmitting/receiving section 24 transmits the exclusive channel ($E\text{-AGCH}_0$ and $E\text{-AGCH}_1$) to the mobile stations 10a to 10c.

Specifically, the transmitting/receiving section 24 transmits the $E\text{-AGCH}_0$ and the $E\text{-AGCH}_1$ including a bit sequence obtained by coding the TrBLK number or the maximum transmission power ratio number shown in FIG. 6, to all of the mobile stations 10a to 10c so as to notify the mobile stations 10a to 10c of the $E\text{-AGCH}_0$ and the $E\text{-AGCH}_1$.

Prior to the transmission of the exclusive channels ($E\text{-AGCH}_0$ and $E\text{-AGCH}_1$), the transmitting/receiving section 24 transmits the codes $C_{256,1}$ and the codes $C_{256,2}$ allocated to the respective exclusive channels to the mobile stations 10a to 10c, so as to notify the mobile stations 10a to 10c of the codes.

Upon receiving the notification of the correspondence between the priority class "high" and the $E\text{-AGCH}_0$, and the correspondence between the priority class "low" and the $E\text{-AGCH}_1$ from the base station control section 33a, the control section 22 receives an instruction to transmit the correspondence between the priority class and the exclusive channel (E-AGCH). In this case, the control section 22 instructs, based on the instruction, the transmitting/receiving section 24 to transmit the correspondence.

Then, the transmitting/receiving section 24 transmits, based on the instruction by the control section 22, a notification channel including the correspondence between the priority class "high" and the code $C_{256,1}$ of the $E\text{-AGCH}_0$, and the correspondence between the priority class "low" and code $C_{256,2}$ of the $E\text{-AGCH}_1$, to the mobile stations 10a to 10c, so as to notify the mobile stations 10a to 10c of the notification channel. Thus, the radio base station 20 uses notification channels of the respective cells to notify of a mapping between the priority class and the corresponding exclusive channel (E-AGCH).

When the exclusive channel (E-AGCH) is provided for every piece of transmission rate information, the transmitting/receiving section 24 may transmit, to every mobile station, the exclusive channel 4 for notifying transmission rate information to be used by the mobile station.

In this case, an instruction to the mobile stations 10a to 10c to determine transmission rate information to be used by each mobile station, and to receive the exclusive channel (E-AGCH) for notifying the determined transmission rate information also may be performed by the radio control station 30 or by the radio base station 20.

For example, when the radio control station 30 determines the $E\text{-AGCH}_0$ as an exclusive channel (E-AGCH) to be used by the mobile station 10a, the control section 22 receives, from the base station control section 33a of the radio control station 30, notification of the code $C_{256,1}$ allocated to the $E\text{-AGCH}_0$ for notifying the transmission rate information determined by the transmission rate control section 33b, and an instruction to transmit $E\text{-AGCH}_0$.

Based on the instruction, the control section 22 instructs the transmitting/receiving section 24 to transmit the $E\text{-AGCH}_0$ to the mobile station 10a. Then, based on the instruction by the control section 22, the transmitting/receiving section 24 transmits the $E\text{-AGCH}_0$ to the mobile station 10*a*. In this case, the instruction from the transmission rate control section 33*b* of the radio control station 30 to the mobile station 10*a* (instruction to receive the E-AGCH$_0$) is transmitted from the transmitting/receiving section 24 to the mobile station 10*a*.

When the above determination is made by the radio base station 20 on the other hand, the control section 22 functions as a transmission rate control section that determines the respective pieces of transmission rate information to be used by the mobile stations 10*a* to 10*c*, and instructs the respective mobile stations 10*a* to 10*c* to receive the exclusive channel (E-AGCH) for notifying the determined transmission rate information.

As in the transmission rate control section 33*b* of the radio control station 30, the control section 22 determines the transmission rate information, and instructs the transmitting/receiving section 24 to transmit the determined exclusive channel (E-AGCH) to a mobile station. The control section 22 also generates, as control data, an instruction to instruct the mobile station to receive the determined exclusive channel (E-AGCH). The generated control data is transmitted from the transmitting/receiving section 24.

It is noted that, when the control section 22 selects the exclusive channel (E-AGCH) based on an interference amount, the interference amount is obtained from the baseband signal processing section 23. The baseband signal processing section 23 measures, based on a reception signal inputted from the transmitting/receiving section 24, the interference amount in an uplink channel. The transmitting/receiving section 24 notifies, prior to the transmission of the determined exclusive channel (E-AGCH), a code allocated to the exclusive channel (E-AGCH) of a mobile station to which the determined exclusive channel (E-AGCH) is to be transmitted.

Figure 11:
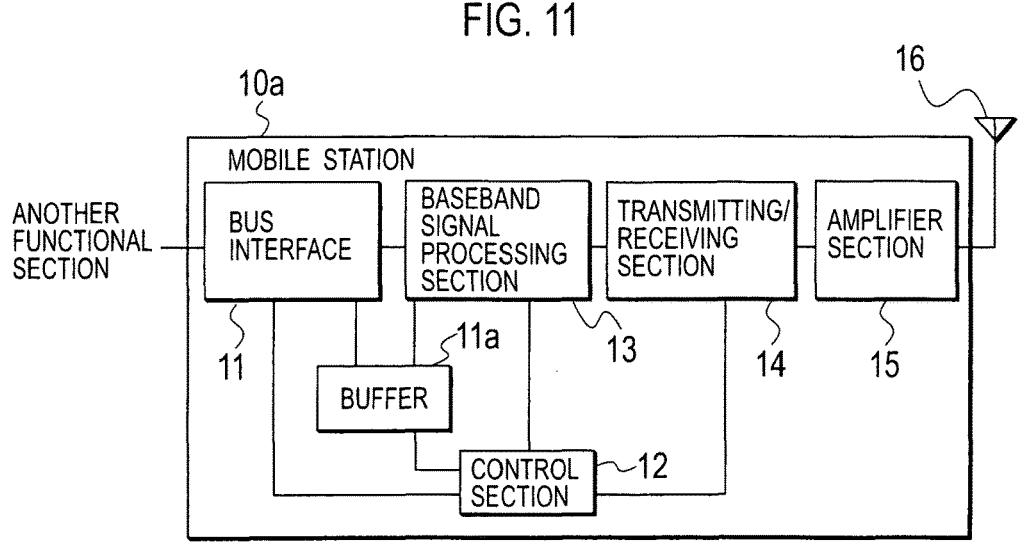
FIG. 11 is a block diagram illustrating the structure of a mobile station according to one embodiment of the present invention.

As shown in FIG. 11, the mobile station 10*a* includes: a bus interface 11; a control section 12; a baseband signal processing section 13; a transmitting/receiving section 14; an amplifier section 15; a transmitting/receiving antenna 16; and a buffer 11*a*.

It is noted that FIG. 11 illustrates only a radio communication functional part of the mobile station 10*a*. The mobile stations 10*b* and 10*c* have the same configuration as that of the mobile station 10*a*.

The bus interface 11 is an interface to other functional sections.

The baseband signal processing section 13 is configured to perform a signal processing for user data and control data to be transmitted to the radio base station 20, and a signal processing for a baseband signal received from the radio base station 20. The signal processing performed by the baseband signal processing section 13 is a signal processing in the layer 1.

The transmitting/receiving section 14 is configured to transmit and receive user data and control data to and from the radio base station 20 via radio. The amplifier section 15 is configured to amplify a signal, and to transmit and receive the signal via the transmitting/receiving antenna 16 to and from the radio base station 20. The buffer 11*a* is configured to accumulate uplink user data to be transmitted by the mobile station 10*a*.

Data to be transmitted from an uplink channel to the mobile station 10*a* (uplink user data and control data) is subjected to a processing as described below.

The bus interface 11 obtains uplink user data for example from another functional section (e.g., input section, external device), and stores the data in the buffer 11*a*. The baseband signal processing section 13 obtains uplink user data from the buffer 11*a*. The control section 12 inputs, to the baseband signal processing section 13, control data to be transmitted to the radio base station 20. The baseband signal processing section 13 performs a signal processing (e.g., error-correcting coding, data modulation, spreading) with regard to the data.

The baseband signal processing section 13 inputs the baseband signal having been subjected to the signal processing to the transmitting/receiving section 14. The transmitting/receiving section 14 converts the baseband signal to a signal having a radio frequency band. The transmitting/receiving section 14 inputs the converted signal to the amplifier section 15, so as to transmit the signal, via the amplifier section 15 and the transmitting/receiving antenna 16, to the radio base station 20. The amplifier section 15 amplifies the signal, and transmits the signal via the transmitting/receiving antenna 16 to the radio base station 20.

Data to be transmitted via a downlink channel to the radio base station 20 (downlink user data and control data) is subjected to a processing as described below.

The amplifier section 15 amplifies the signal received by the transmitting/receiving antenna 16, and inputs the amplified signal to the transmitting/receiving section 14. The transmitting/receiving section 14 receives the signal from the radio base station 20 via the transmitting/receiving antenna 16 and the amplifier section 15. The transmitting/receiving section 14 converts the received signal to a baseband signal, and inputs the baseband signal to the baseband signal processing section 13. Specifically, the transmitting/receiving section 14 performs a processing such as detection, filtering, or quantization to extract a baseband signal, so as to extract a baseband signal.

The baseband signal processing section 13 performs a signal processing (e.g., despreading, RAKE synthesis, error-correcting decoding), with regard to the baseband signal. The baseband signal processing section 13 inputs the user data having been subjected to the signal processing to the bus interface 11, and inputs the control data having been subjected to the signal processing to the control section 12. The bus interface 11 outputs downlink user data to another functional section (e.g., output section, external device). The control section 12 performs various controls of a call control (e.g., a calling control, a called control).

The transmitting/receiving section 14 also functions as a reception section that receives an exclusive channel (E-AGCH) for notifying a mobile station of transmission rate information for a transmission rate of user data of an uplink channel. The transmitting/receiving section 14 also functions as a transmission section that uses the transmission rate information notified by the exclusive channel (E-AGCH), so as to transmit uplink user data.

For example, the transmitting/receiving section 14 receives, from the radio base station 20, signals transmitted from a plurality of exclusive channels (E-AGCH$_0$ and E-AGCH$_1$) and inputs the signals to the baseband signal processing section 13.

The baseband signal processing section 13 uses the codes of the exclusive channels (E-AGCH$_0$ and E-AGCH$_1$) notified from the radio base station 20 prior to the reception of the exclusive channels (E-AGCH$_0$ and E-AGCH$_1$), so as to generate a code for a despreading and to perform the despreading.

The baseband signal processing section 13 performs a RAKE synthesis and an error-correcting decoding for a symbol having been subjected to the despreading, so as to obtain transmission rate information which is mapped to the exclusive channel (E-AGCH$_0$ and E-AGCH$_1$) and transmitted.

The transmitting/receiving section 14 also may periodically receive the exclusive channel (E-AGCH$_0$ and E-AGCH$_1$), or also may receive the exclusive channel (E-AGCH$_0$ and E-AGCH$_1$) in accordance with an update cycle of transmission rate information notified by the exclusive channel (E-AGCH$_0$ and E-AGCH$_1$). Then, the baseband signal processing section 13 obtains the transmission rate information periodically or based on every update cycle.

The baseband signal processing section 13 inputs, to the control section 12, the transmission rate information obtained by decoding. The control section 12 determines, from among the transmission rate information obtained by the exclusive channel (E-AGCH$_0$ and E-AGCH$_1$), transmission rate information to be used by the mobile station 10a.

For example, the control section 12 can determine transmission rate information to be used, based on a priority class of communication to be performed by the mobile station 10a, an interference amount of an uplink channel being used, user data amount (data size) accumulated in the buffer 11a, the transmission power or transmission processing capability of the mobile station 10a, a transmission rate required by a higher-order application for communication, and the like.

Furthermore, the control section 12 determines, when the determined transmission rate information does not represent a transmission rate itself, a transmission rate based on the transmission rate information.

When the transmission rate information represents a TrBLK number shown in FIG. 5 for example, the control section 12 determines the corresponding TrBLK size as a transmission rate. When the determined transmission rate information is the maximum transmission power ratio number shown in FIG. 5, the control section 12 determines the corresponding maximum transmission power ratio as a transmission rate.

The control section 12 determines a transmission format, based on the determined transmission rate, transmission power, user data amount accumulated in the buffer 11a, and the like, so as to specify the transmission format to the baseband signal processing section 13.

Based on the determined transmission format, the baseband signal processing section 13 generates a baseband signal including uplink user data, so as to input the baseband signal to the transmitting/receiving section 14.

Furthermore, the transmitting/receiving section 14 also can receive a signal transmitted via a notification channel for notifying a correspondence between a priority of communication and an exclusive channel (E-AGCH). In this case, the signal received by the transmitting/receiving section 14 is also inputted to the baseband signal processing section 13. The baseband signal processing section 13 processes the received signal, so as to decode and obtain the correspondence transmitted via the notification channel. The baseband signal processing section 13 inputs the obtained correspondence to the control section 12.

The control section 12 can determine a priority class of the communication to be performed by the mobile station 10a, and an exclusive channel (E-AGCH) to be received based on the correspondence. For example, the control section 12 can determine, when the communication to be performed by the mobile station 10a has a priority class "high", the E-AGCH$_0$ corresponding to the priority class "high" as an exclusive channel (E-AGCH) to be received.

The control section 12 instructs the transmitting/receiving section 14 to receive the determined exclusive channel (E-AGCH$_0$). In this manner, the transmitting/receiving section 14 can receive the correspondence between the priority of communication and the exclusive channel (E-AGCH) to be received, and receive only required exclusive channel (E-AGCH), based on the correspondence.

Furthermore, the transmitting/receiving section 14 preferably receive such an exclusive channel (E-AGCH) that is transmitted for every mobile station. When a setup request of a channel is received from the mobile station 10a or depending on the change in an amount of interference of an uplink channel used by the mobile station 10a after the start of the communication, the radio control station 30 or the radio base station 20 may determine an exclusive channel (E-AGCH) for notifying transmission rate information to be used by the mobile station 10a, so as to instruct the mobile station 10a to receive the determined exclusive channel (E-AGCH).

The transmitting/receiving section 14 receives a reception instruction of an exclusive channel (E-AGCH) from the radio control station 30 or the radio base station 20. In this case, the signal received by the transmitting/receiving section 14 is also inputted to the baseband signal processing section 13.

The baseband signal processing section 13 processes the received signal, so as to decode and obtain a reception instruction. The baseband signal processing section 13 inputs the obtained reception instruction to the control section 12. The control section 12 instructs the transmitting/receiving section 14 to receive an exclusive channel (E-AGCH) specified by the reception instruction. Then, the baseband signal processing section 13 uses a code allocated to the specified exclusive channel (E-AGCH), so as to perform a depsreading.

It is noted that as for the configuration of the radio control station 30 shown in FIG. 8, the configuration of the radio base station 20 shown in FIG. 10, and the configuration of the mobile station 10a shown in FIG. 11, some of the configurations may be combined or a single configuration may be separately used.

The respective configurations may be provided by hardware or software. As described above, a transmission rate of user data transmitted via an uplink channel from the mobile stations 10a to 10c to radio base station 20 can be controlled by the control in the layer 1 and the layer 2 among the mobile stations 10a to 10c, the radio base station 20, and the radio control station 30.

(Operation of Mobile Communication System According to this Embodiment)

Figure 12:
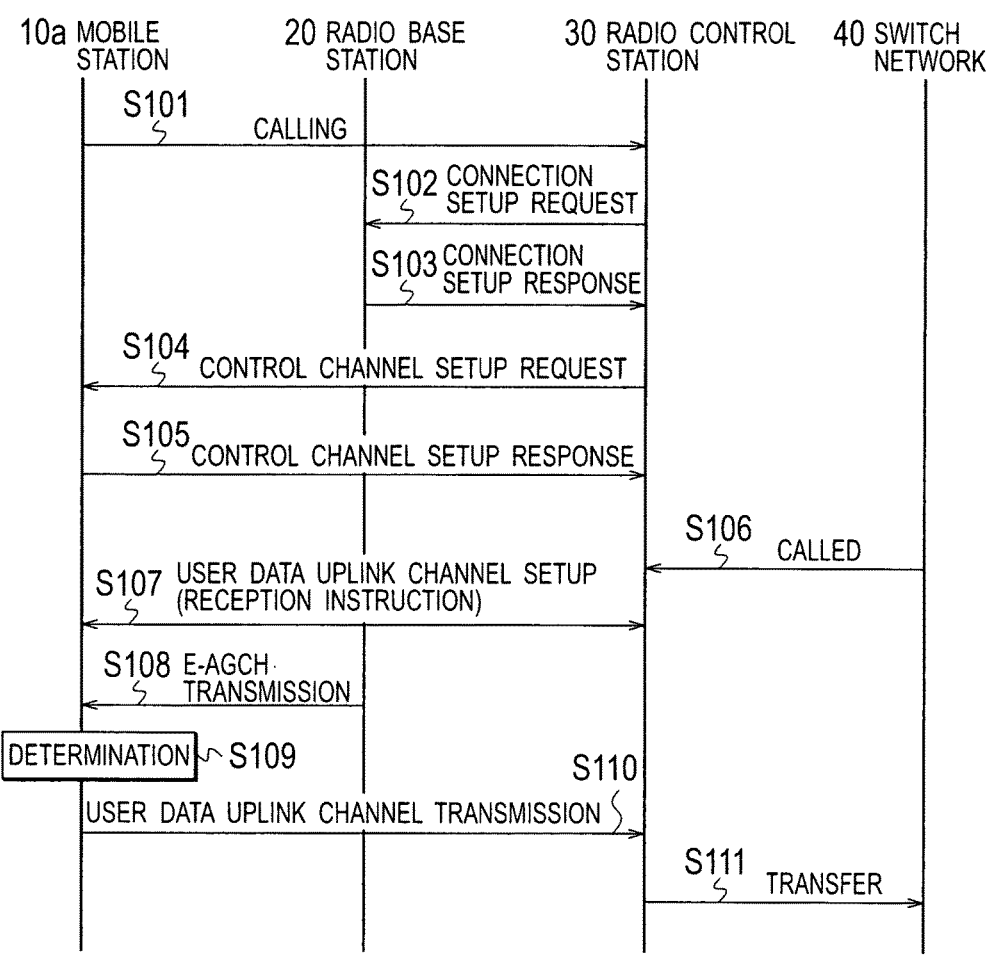
FIG. 12 is a sequence diagram illustrating a procedure of a mobile communication method according to one embodiment of the present invention.

With reference to FIG. 12, a procedure of a mobile communication method in the mobile communication system 100 will be described.

In Step S101, the mobile station 10a performs a calling processing, so as to transmit a setup request of an uplink channel for transmitting uplink user data via the radio base station 20 to the radio control station 30.

In Step S102, the radio control station 30 transmits a connection setup request to the radio base station 20.

In Step S103, the radio base station 20 transmits a connection setup response to the radio control station 30, in response to the connection setup request. As a result, connection for communication with the mobile station 10a is established between the radio base station 20 and the radio control station 30.

Next, in Step S104, the radio control station 30 transmits a setup request of a control channel to be used for the transmission and reception of control data via the radio base station 20 to the mobile station 10*a*. The setup request includes a frequency to be used, and the like.

In Step S105, the mobile station 10*a* transmits a control channel setup response to the radio control station 30, in response to the setup request.

Thereafter, in Step S106, user data from a communication party of the mobile station 10*a* is sent from the exchange network 40 to the radio control station 30.

In Step S107, the radio control station 30 and the mobile station 10*a* setup an uplink channel for the transmission and reception of user data via the radio base station 20. It is noted that the uplink channel setting is performed by a plurality of processings.

In Step S107, either the radio control station 30 or the radio base station 20 determines, based on a priority of communication to be started by the mobile station 10*a* and the like, an exclusive channel (E-AGCH) to be transmitted to the mobile station 10*a*, so as to notify the mobile station 10*a* of the code and to instruct the mobile station 10*a* to receive the exclusive channel (E-AGCH).

In Step S108, the radio base station 20 transmits the determined exclusive channel (E-AGCH) to the mobile station 10*a*.

In Step S109, the mobile station 10*a* determines, based on the transmission rate information notified by the exclusive channel (E-AGCH), a transmission rate to be used.

In Step S110, the mobile station 10*a* transmits uplink user data, at the determined transmission rate, by using an uplink channel.

In Step S111, the radio control station 30 transfers the uplink user data transmitted from the mobile station 10*a* to the exchange network 40.

(Action and Effect of Mobile Communication System According to this Embodiment)

According to the mobile communication system 100, the radio control station 30, the radio base station 20, the mobile stations 10*a* to 10*c*, the mobile communication method (hereinafter referred to as mobile communication system and the like) as described above, a transmission rate can be controlled without using a general common channel (SC-CPCH).

Thus, the mobile communication system 100 can reduce the transmission power of a downlink and can reduce the restriction of a downlink capacity. Thus, an impact on the downlink can be suppressed and a transmission rate of user data via an uplink channel can be appropriately controlled.

According to the mobile communication system and the like as described above, an exclusive channel (E-AGCH) is provided for every piece of transmission rate information to be notified, and any of the radio control station 30 or the radio base station 20 determines transmission rate information to be used by a mobile station and instructs the mobile station to receive an exclusive channel (E-AGCH) for notifying the determined transmission rate information. Then, the radio base station 20 can transmit the exclusive channel (E-AGCH) for notifying the determined transmission rate information to the mobile station.

Thus, in the mobile communication system 100, a different exclusive channel (E-AGCH) can be used for every mobile station. Thus, it is possible to transmit, to the respective mobile station, only an exclusive channel (E-AGCH) for notifying transmission rate information to be used by the respective mobile station, the mobile station 10*a* to 10*c* can receive only exclusive channels (E-AGCH) required for the mobile stations 10*a* to 10*c*. Thus, in the mobile communication system 100, a downlink transmission power can be further reduced, and the restriction of a downlink capacity can be further reduced. A signaling load is also reduced.

According to the mobile communication system and the like as described above, when an exclusive channel (E-AGCH) is provided for every piece of transmission rate information, the radio base station 20 also can transmit a correspondence between a priority of communication and an exclusive channel to the mobile stations 10*a* to 10*c* by using a notification channel and the like.

Thus, the mobile stations 10*a* to 10*c* can determine an exclusive channel (E-AGCH) to be received based on the correspondence, so as to receive only the required exclusive channel (E-AGCH). Furthermore, the radio base station 20 and the radio control station 30 can omit a control for specifying an exclusive channel (E-AGCH) to be received by the mobile stations 10*a* to 10*c*. Thus, in the mobile communication system 100, an appropriate control of a transmission rate can be achieved in consideration of a priority of communication, and a control load can be reduced.

Furthermore, when the transmission rate control section determines transmission rate information to be used by a mobile station, based on at least one of a priority of the communication to be performed by the mobile station or an interference amount, in the mobile communication system as described above, an appropriate control of a transmission rate can be achieved in consideration of a priority of communication or an interference amount.

As the priority of the communication to be performed by a mobile station, for example, a priority set based on the class of the service quality (QoS) of uplink user data transmitted from the mobile station and the like, or a priority set based on the contents of a communication service covered by the contract of a user of the mobile station and the like can be used. As an interference amount, for example, an interference power, a CIR, a SIR, or an SN ratio and the like can be used.

When the transmission section transmits an exclusive channel in which lower-order bits have higher redundancy than that of higher-order bits, the mobile communication system as described above can allow, during an error-correcting coding, higher-order bits to have higher redundancy than that of lower-order bits, so as to reduce an error in a transmission rate due to an error in the notification of transmission rate information.

As described above, according to the present invention, in the Enhanced Uplink, exclusive channels for transmitting transmission rate information common to a plurality of cells can be prepared to reduce overhead, so as to reduce an influence on the downlink capacity.

Furthermore, according to the present invention, transmission rate information is transmitted by a different exclusive channel for every priority class. Thus, when priority classes are not used to the maximum, a entire transmission power of the exclusive channels (E-AGCHH) can be reduced, and the restriction of the downlink capacity can be prevented. Thus, the mobile communication system 100 can have an improved communication performance (e.g., communication capacity, quality).

It is noted that the mobile communication system as described above is a technique particularly effective for W-CDMA or CDMA2000 as the third generation mobile communication system.

As described above, the present invention has been described in details by illustrative embodiments. However, it is clear for those skilled in the art that the present invention is not limited to the illustrative embodiments described in this application. The apparatus of the present invention can be changed or modified without departing the intention and scope of the present invention defined by the claims. Thus, the description of this application is for an illustrative description and does not limit in any way the present invention.

INDUSTRIAL APPLICABILITY

As described above, the present invention can provide a mobile communication system, a radio control station, a radio base station, a mobile station, and a mobile communication method by which an influence on a downlink can be suppressed and a transmission rate of uplink user data can be appropriately controlled.

The invention claimed is:

1. A mobile communication system provided with a radio control station and radio base station, wherein:
the radio control station comprises a notification section configured to notify the radio base station of a spread code of an exclusive downlink channel in which notification only of transmission rate information is provided for notifying a respective mobile station of the transmission rate information regarding a respective transmission rate of user data on an uplink channel for the respective mobile station, and in which notification of information other than the transmission rate information is not provided, and further configured to notify the respective mobile station of the spread code of the exclusive downlink channel provided for the notification of the transmission rate information of the respective transmission rate of the user data on the uplink channel for the respective mobile station;
the radio base station comprises a transmission rate control section configured to determine the transmission rate information regarding the respective transmission rate of the user data on the uplink channel for the respective mobile station to transmit the user data on the uplink channel, and a transmission section configured to transmit to the respective mobile station the determined transmission rate information regarding the respective transmission rate of the user data on the uplink channel for the respective mobile station via the exclusive downlink channel of which the spread code is notified; wherein
the exclusive downlink channel is an Enhanced Absolute Grant Channel (E-AGCH) over which only the transmission rate information is transmitted from the radio base station to the respective mobile station; and
the notification section is configured to notify the radio base station of the spread code of the E-AGCH allocated to the respective mobile station prior to the transmission of the E-AGCH to the respective mobile station.

2. The mobile communication system according to claim 1, wherein:
the transmission section is configured to transmit to the respective mobile station a correspondence between a priority of communication and the exclusive downlink channel.

3. The mobile communication system according to claim 1, wherein:
the transmission section is configured to transmit to the respective mobile station the determined transmission rate information via the exclusive downlink channel in which lower-order bits have higher redundancy than that of higher-order bits.

4. The mobile communication system according to claim 1, wherein:
the notification section is configured to notify the respective mobile station of a correspondence between a priority of communication and the exclusive downlink channel.

5. The mobile communication system according to claim 1, wherein:
the exclusive downlink channel is provided to be corresponded with a priority of communication.

6. A radio control station, comprising:
a notification section configured to notify a radio base station of a spread code of an exclusive downlink channel in which notification of only transmission rate information is provided for notifying a respective mobile station of the transmission rate information regarding a respective transmission rate of user data on an uplink channel for the respective mobile station, and in which notification of information other than the transmission rate information is not provided, and further configured to notify the respective mobile station of the spread code of the exclusive downlink channel provided for the notification of the transmission rate information of the respective transmission rate of the user data on the uplink channel for the respective mobile station; wherein
the exclusive downlink channel is an Enhanced Absolute Grant Channel (E-AGCH) over which only the transmission rate information is provided to the respective mobile station; and
the notification section is configured to notify the radio base station of the spread code of the E-AGCH allocated to the respective mobile station prior to the transmission of the E-AGCH to the respective mobile station.

7. The radio control station according to claim 6, wherein:
the notification section is configured to control the radio base station so as to notify the respective mobile station of a correspondence between a priority of communication and the exclusive downlink channel.

8. The radio control station according to claim 6, wherein:
the exclusive downlink channel is provided to be corresponded with a priority of communication.

9. A radio base station, comprising:
a notification section configured to notify a respective mobile station of a spread code of an exclusive downlink channel in which notification of only transmission rate information is provided for notifying the respective mobile station of the transmission rate information regarding a respective transmission rate of user data on an uplink channel for the respective mobile station to transmit the user data, and in which notification of information other than the transmission rate information is not provided;
a transmission rate control section configured to determine the transmission rate information regarding the respective transmission rate of the user data on the uplink channel for the respective mobile station to transmit the user data, and
a transmission section configured to transmit to the respective mobile station the determined transmission rate information regarding the respective transmission rate of the user data on the uplink channel for the respective mobile station via the exclusive downlink channel of which the spread code is notified; wherein
the exclusive downlink channel is an Enhanced Absolute Grant Channel (E-AGCH) over which only the transmission rate information is transmitted to the respective mobile station; and
the notification section is configured to notify the radio base station of the spread code of the E-AGCH allocated to the respective mobile station prior to the transmission of the E-AGCH to the respective mobile station.

10. The radio base station according to claim 9, wherein the transmission section is configured to transmit to the respective mobile station a correspondence between a priority of communication and the exclusive downlink channel.

11. The radio base station according to claim 9, wherein:
the transmission section is configured to transmit to the respective mobile station the determined transmission rate information via the exclusive downlink channel in which lower-order bits have higher redundancy than that of higher-order bits.

12. A mobile station, comprising:
a reception section configured to receive a spread code of an exclusive downlink channel in which notification of only transmission rate information is provided for notifying the mobile station of transmission rate information regarding a respective transmission rate of user data on an uplink channel and in which notification of information other than the transmission rate information is not provided; and
a transmission section configured to transmit the user data on the uplink channel using the transmission rate information regarding the respective transmission rate of the user data on the uplink channel received via the exclusive downlink channel of which the spread code is notified; wherein
the exclusive downlink channel is an Enhanced Absolute Grant Channel (E-AGCH) over which only the notification of the transmission information is received in the reception section; and
the reception section is configured to receive the spread code of the E-AGCH prior to reception of the E-AGCH.

13. The mobile station according to claim 12, wherein:
the reception section is configured to receive a correspondence between a priority of communication and the exclusive downlink channel, and to receive, based on the correspondence, the exclusive downlink channel.

14. The mobile station according to claim 12, wherein: the exclusive downlink channel is provided to be corresponded with a priority of communication.

15. The mobile station according to claim 12, wherein: the reception section is configured to transmit to the mobile station the determined transmission rate information via the exclusive downlink channel in which lower-order bits have higher redundancy than that of higher-order bits.

16. A mobile communication method, comprising:
transmitting from a radio control station to a radio base station and from the radio base station to a respective mobile station, a spread code of an exclusive downlink channel in which notification of only transmission rate information is provided for notifying the respective mobile station of the transmission rate information regarding a respective transmission rate of user data on an uplink channel and in which notification of information other than the transmission rate information is not provided;
determining the transmission rate information to be used by the respective mobile station; and
transmitting to the respective mobile station the determined transmission rate information via the exclusive downlink channel; wherein
the exclusive downlink channel is an Enhanced Absolute Grant Channel (E-AGCH) over which transmission of only the transmission rate information occurs from the radio base station to the respective mobile station; and
transmitting from the radio control station to the radio base station and from the radio base station to the respective mobile station, the spread code of the exclusive downlink channel comprises transmitting from the radio control station to the radio base station and from the radio base station to the respective mobile station the spread code of the E-AGCH allocated to the respective mobile station prior to the transmission of the E-AGCH to the respective mobile station.

* * * * *